(No Model.)

L. STOW.

HOPPLE.

No. 291,105. Patented Jan. 1, 1884.

Witnesses.
N. A. Clark,
P. B. Turpin.

Inventor
Lorenzo Stow
By R. S. & A. P. Lacey
Attys

UNITED STATES PATENT OFFICE.

LORENZO STOW, OF ROME, TENNESSEE.

HOPPLE.

SPECIFICATION forming part of Letters Patent No. 291,105, dated January 1, 1884.

Application filed September 24, 1883. (No model.)

*To all whom it may concern:*

Be it known that I, LORENZO STOW, a citizen of the United States, residing at Rome, in the county of Smith and State of Tennessee, have invented certain new and useful Improvements in Hopples; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hopples; and it consists in the construction, combination, and arrangement of the several parts, as will be hereinafter described and claimed.

Figure 1:
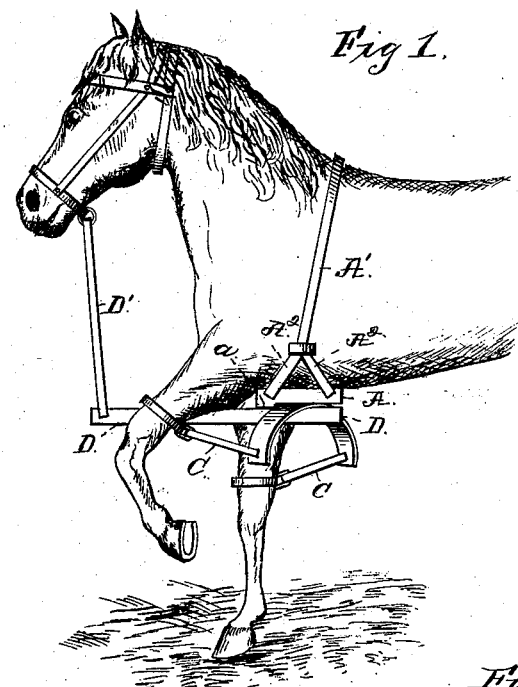
Figure 2:
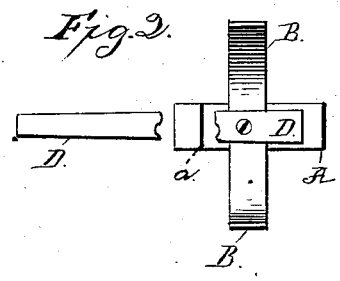
Figure 3:
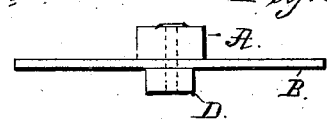
Figure 4:
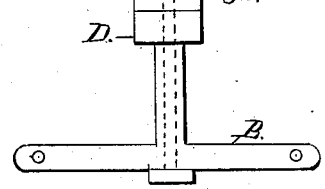

In the drawings, Figure 1 shows my improvements as applied to a horse. Fig. 2 is an under side view of the device, and Figs. 3 and 4 show modifications, all of which will be described.

The object of my invention, mainly, is to provide a yoke pivoted centrally to a suitable support in rear of the animal's fore legs, and connect the said legs with the outer ends of said yoke. For a further object it aims to pivot the said yoke, and so construct it that its outer ends will rest in a plane below its pivotal support. It has for a further object the bending of said yoke in arc shape, so that its outer ends will be in a plane below its pivot or central portion. It has for its further object other improvements, all of which will be fully described, and specifically pointed out in the claims.

The supporting-block A is secured to the animal by means of the surcingle A', and is arranged under the animal's breast slightly in rear of the fore legs, as shown. The surcingle is connected with the opposite ends of the block by means of straps A², so as to prevent any longitudinal rocking or tilting of said block, and hold it firmly against the animal in the operation of the device. On the under side of this block and near its forward end I form or secure a shoulder or stop, $a$, to limit the forward motion of the arms of the yoke. This yoke B is pivoted centrally to the block A at a point in rear of the stop $a$, and its outer ends are connected with the animal's fore legs by means of straps C C, which are fastened to the legs at a point close above the knee-joint, as shown in Fig. 1. This yoke may be made straight, as shown in Fig. 3; but in such case the straps C C would be inclined downward, and therefore I prefer to so construct the yoke that its outer ends will be in a plane below the pivotal support and in about a horizontal plane with point of connection of straps C and the animal's legs. This may be accomplished by the construction shown in Fig. 4, or that shown in Figs. 1 and 2. I prefer the latter, as thereby a simple construction is provided, and one which will be easier in action, and will co-operate more efficiently with the other parts than that shown in Fig. 4. It consists in bending the yoke in the arc shape shown. This yoke is pivoted at its crown to the block A, as shown, and its portions on either side of and near the pivot will engage the stop $a$, when moved forward, while its ends are bent down, as shown.

The head-supporting bar D is pivoted at its rear end to the block A, preferably on the same center with the yoke, and its other end is extended through between the animal's fore legs, and is connected by strap D' with the animal's head.

The operation of my improved hopple is simple, and its uses and advantages will be obvious from the foregoing description. The yoke permits the animal to move one leg forward at a time, but prevents the forward movement of both simultaneously, and thereby prevents the animal from jumping a fence or other obstruction. The stop $a$ limits the forward movement of the arms of the yoke, and prevents one leg being moved so far forward as to cause any disagreeable backward draw on the other. The head-holding bar prevents the head from being thrown too far, and thereby prevents the animal from throwing off the top rails of fences. It may be adjusted by lengthening or shortening the strap D' to suit different-sized animals or according to the known determination of any particular animal to throw the rails from the fence. This head-holding bar may be dispensed with when not desired.

Having thus described my invention, what I claim, and desire to secure by Letters Patent, is—

1. In a hopple substantially as described and shown, the combination of a yoke pivoted centrally on a suitable support in rear of the animal's fore legs, and straps connecting the outer ends of said yoke with the animal's legs, and means whereby the support may be attached to the animal's body, as and for the purposes specified.

2. In a hopple, the combination of a suitable support, means whereby said support is attached to the animal's body, a yoke pivoted centrally to said support, and having its outer ends arranged in a plane below that of the support, and straps secured to the ends of said yoke and adapted to connect the same with the animal's fore legs, substantially as set forth.

3. In a hopple, the arc-shaped yoke pivoted at its crown to a suitable support, and having its lower ends provided with straps whereby it may be connected with the animal's fore legs in combination with said support and means whereby it may be attached to the animal's body, all substantially as and for the purposes specified.

4. In a hopple, the combination, with a suitable support held under the animal's breast in rear of and close to the fore legs, of the head-holding bar, having its rear end pivoted to the said support and extended forward between the animal's fore legs and connected at its forward end with the animal's head, and adapted to be swung laterally, substantially as set forth.

5. In a hopple, the combination of the supporting-block, having on its under side a shoulder or stop, a, the yoke pivoted centrally to the said block in rear of the said shoulder or stop, and straps secured to the ends of said yoke, and means whereby the said supporting-block is held to the animal's body, all substantially as and for the purposes specified.

In testimony whereof I affix my signature in presence of two witnesses.

LORENZO STOW.

Witnesses:
J. S. RUYL,
R. BOYERS.